United States Patent
Ryon et al.

(10) Patent No.: US 9,500,164 B2
(45) Date of Patent: Nov. 22, 2016

(54) AIR FILTER ELEMENT AND FILTER HOUSING

(71) Applicant: CATERPILLAR INC., Peoria, IL (US)

(72) Inventors: Shawn Ryon, Metamora, IL (US); Mark Alan Rosenfeld, Peoria, IL (US)

(73) Assignee: Caterpillar, Inc., Peoria, IL (US)

( * ) Notice: Subject to any disclaimer, the term of this patent is extended or adjusted under 35 U.S.C. 154(b) by 120 days.

(21) Appl. No.: 14/473,211

(22) Filed: Aug. 29, 2014

(65) Prior Publication Data
US 2016/0061159 A1    Mar. 3, 2016

(51) Int. Cl.
| | | |
|---|---|---|
| *B01D 50/00* | (2006.01) | |
| *B23P 11/00* | (2006.01) | |
| *B01D 45/16* | (2006.01) | |
| *B01D 46/52* | (2006.01) | |
| *B01D 46/42* | (2006.01) | |
| *B01D 46/10* | (2006.01) | |
| *B01D 36/00* | (2006.01) | |

(Continued)

(52) U.S. Cl.
CPC .... *F02M 35/02483* (2013.01); *B01D 46/0002* (2013.01); *B01D 46/0019* (2013.01); *B01D 46/0095* (2013.01); *B01D 46/2403* (2013.01); *F02M 35/0216* (2013.01); *B01D 2271/027* (2013.01); *B01D 2275/205* (2013.01)

(58) Field of Classification Search
CPC ...... B01D 50/00; B01D 45/16; B01D 46/52; B01D 46/42; B01D 46/10; B01D 36/00; B01D 35/30; B23P 11/00
USPC ...... 55/385.3, 481, 321, 357, 502, 498, 421; 210/238, 470, 492, 493.4
See application file for complete search history.

(56) References Cited

U.S. PATENT DOCUMENTS

| | | | | |
|---|---|---|---|---|
| 4,394,147 A | * | 7/1983 | Caddy | B01D 46/10 55/357 |
| 4,678,489 A | * | 7/1987 | Bertelsen | A47L 9/122 454/49 |

(Continued)

FOREIGN PATENT DOCUMENTS

| | | |
|---|---|---|
| DE | 10328002 | 1/2005 |
| DE | 102012106218 | 1/2014 |

(Continued)

*Primary Examiner* — Jacob T Minskey
*Assistant Examiner* — Minh-Chau Pham
(74) *Attorney, Agent, or Firm* — Finnegan, Henderson, Farabow, Garrett & Dunner, LLP

(57) ABSTRACT

Disclosed are various exemplary embodiments of an air filter element for a machine. The air filter element may include a generally rectangular body with a rounded bottom surface, where the generally rectangular body may be configured to be inserted into a filter housing in a first direction. The filter element may also include an inlet opening at a top surface opposite to the bottom surface of the generally rectangular body, where the inlet opening may face in a direction substantially perpendicular to the first direction. The filter element may also include a front surface facing substantially in the first direction and defining a discharge opening and a rear surface opposite to the front surface of the generally rectangular body. The filter element may further include a sealing element disposed on a side surface of the generally rectangular body between the front surface and the rear surface, such that the sealing element substantially may seal off a gap between the side surface of the filter housing and the generally rectangular body when the generally rectangular body is inserted into the filter housing.

11 Claims, 3 Drawing Sheets

(51) Int. Cl.
  *B01D 35/30*  (2006.01)
  *F02M 35/024*  (2006.01)
  *B01D 46/00*  (2006.01)
  *B01D 46/24*  (2006.01)
  *F02M 35/02*  (2006.01)

(56) References Cited

U.S. PATENT DOCUMENTS

| | | | | |
|---|---|---|---|---|
| 4,767,531 A * | 8/1988 | Holzer | ............... | B01D 63/10 210/238 |
| 5,069,790 A * | 12/1991 | Mordeki | ............... | B01D 29/46 210/323.1 |
| 5,211,846 A * | 5/1993 | Kott | ............... | B01D 29/21 210/232 |
| 5,472,463 A * | 12/1995 | Herman | ............... | B01D 46/0047 123/198 E |
| 5,536,290 A * | 7/1996 | Stark | ............... | B01D 46/2414 55/498 |
| 5,601,717 A * | 2/1997 | Villette | ............... | B01D 29/21 210/493.1 |
| 5,820,646 A * | 10/1998 | Gillingham | ............... | B01D 25/001 55/488 |
| 6,179,890 B1 | 1/2001 | Ramos et al. | | |
| 6,235,195 B1 * | 5/2001 | Tokar | ............... | B01D 25/001 210/238 |
| 8,101,003 B2 | 1/2012 | Krisko et al. | | |
| 8,241,384 B2 | 8/2012 | Schrage et al. | | |
| 8,702,831 B2 | 4/2014 | Scott et al. | | |
| 2009/0145093 A1* | 6/2009 | Krisko | ............... | B01D 45/12 55/321 |
| 2009/0145095 A1 | 6/2009 | Juliar et al. | | |
| 2010/0186353 A1* | 7/2010 | Ackermann | ............... | B01D 46/0021 55/321 |
| 2012/0124947 A1* | 5/2012 | Dewit | ............... | B01D 46/0005 55/321 |

FOREIGN PATENT DOCUMENTS

| | | |
|---|---|---|
| WO | WO 2009/039285 A1 | 3/2009 |
| WO | 2011157687 | 12/2011 |
| WO | 2012084753 | 6/2012 |

* cited by examiner

AIR FILTER ELEMENT AND FILTER HOUSING

TECHNICAL FIELD

The present disclosure relates generally to air filtration systems and, more particularly, to an air filter element and filter housing.

BACKGROUND

In a combustion engine, air from the surrounding atmosphere is introduced to the engine to mix with fuel in the combustion chamber. Dirty and/or contaminated intake air may not only affect the engine performance, but also damage moving parts of the engine, resulting in increased maintenance costs and reduced life of the engine. To ensure the cleanliness of the intake air, an air cleaner is used to filter out dirt, debris, and other contaminants from the intake air.

Off-highway machines, such as, for example, tractors, wheel loaders, backhoe loaders, bulldozers, and excavators, may operate in and be exposed to harsh working environments with high concentrations of dust and debris. The air cleaners used in these machines offer high strength to withstand the vibrations expected in the machines and high dirt-holding capacity to adequately protect the engine for the desired service life of the filter elements. Accordingly, these machines are equipped with a relatively large air cleaner. An air cleaner may include an air filter element and a filter housing for housing and protecting the air filter element. Certain types of air cleaners may have a gap between a primary filter element and a filter housing. The gap may allow unfiltered air to bypass the primary filter element and deposit dust and debris in a space between the primary filter element and the filter housing, which may require extra cleaning of the filter housing when replacing or servicing the primary filter element. Further, the dust and debris accumulated in the space may cause discoloration of the secondary filter element, creating a fictitious belief that the dust is getting past the primary filter element or that the air cleaner is inferior to other designs.

One example of an engine air cleaner for a motorized vehicle is disclosed in U.S. Pat. No. 6,179,890 B1 ("the '890 patent") to Ramos et al. The air cleaner disclosed in the '890 patent includes a housing and a media pack oriented within the interior volume of the housing. The media pack has first and second opposite flow faces and is constructed such that the air flows into the media pack through the first flow face and exits the media pack through the second flow face. The air cleaner also includes a seal member forming a seal between the media pack and the housing.

Many problems and/or disadvantages still exist with the known filter elements and/or filter housings. Various embodiments of the present disclosure may solve one or more of the problems and/or disadvantages discussed above.

SUMMARY

According to one exemplary aspect, the present disclosure is directed to an air filter element. The air filter element may include a generally rectangular body with a rounded bottom surface, where the generally rectangular body may be configured to be inserted into a filter housing in a first direction. The filter element may also include an inlet opening at a top surface opposite to the bottom surface of the generally rectangular body, where the inlet opening may face in a direction substantially perpendicular to the first direction. The filter element may also include a front surface facing substantially in the first direction and defining a discharge opening and a rear surface opposite to the front surface of the generally rectangular body. The filter element may further include a sealing element disposed on a side surface of the generally rectangular body between the front surface and the rear surface, such that the sealing element substantially may seal off a gap between the side surface of the filter housing and the generally rectangular body when the generally rectangular body is inserted into the filter housing.

Another exemplary aspect of the present disclosure may provide an air filter housing. The air filter housing may include a generally rectangular body with a rounded bottom surface, where the generally rectangular body may define an interior for receiving a filter element. The filter housing may also include a rear opening in the generally rectangular body for slidably receiving the filter element in a first direction and a top wall, opposite to the bottom surface of the generally rectangular body, defining an inlet opening for receiving air. The inlet opening may face in a direction substantially perpendicular to the first direction. The filter housing may also include a discharge opening on a front surface opposite to the rear opening. The filter housing may further include a sealing element disposed on an interior surface of the generally rectangular body, such that the sealing element may substantially seal off a gap between the interior surface and the filter element when the filter element is received in the interior.

In still another exemplary aspect, the present disclosure is directed to a method of sealing a gap between a filter element and a filter housing. The method may include providing a filter housing and a filter element. The filter housing may include a first generally rectangular body with a rounded bottom surface, where the first generally rectangular body defines an interior. The filter housing may also include a rear opening in the first generally rectangular body for slidably receiving a filter element in a first direction and a top wall, opposite to the bottom surface of the first generally rectangular body, defining an inlet opening for receiving air, where the inlet opening may face in a direction substantially perpendicular to the first direction. The filter element may include a second generally rectangular body with a rounded bottom surface, where the second generally rectangular body may be configured to be inserted into the filter housing in the first direction. The filter element may also include an inlet opening at a top surface opposite to the bottom surface of the second generally rectangular body, where the inlet opening may face in a direction substantially perpendicular to the first direction. The method may also include placing a sealing element either on an interior surface of the first generally rectangular body or on an outer surface of the second generally rectangular body. The method may further include slidably inserting the filter element into the rear opening of the filter housing, such that the sealing element may substantially seal off the gap between the interior surface of the first generally rectangular body and the outer surface of the second generally rectangular body.

DETAILED DESCRIPTION

Figure 1:
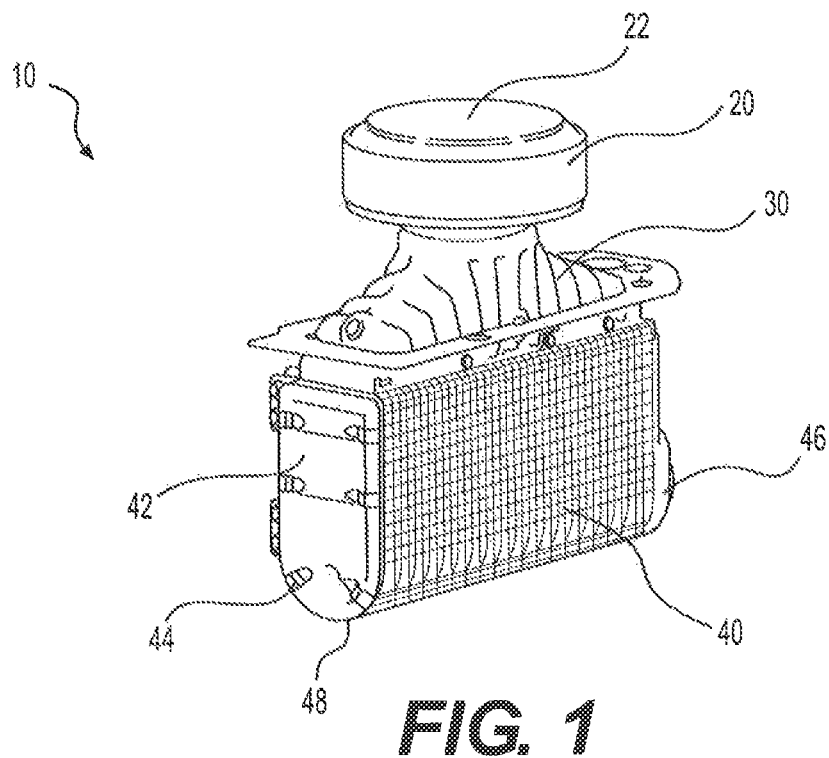
FIG. 1 is a perspective view of an air cleaner, according to one exemplary embodiment of the present disclosure.
Figure 2:
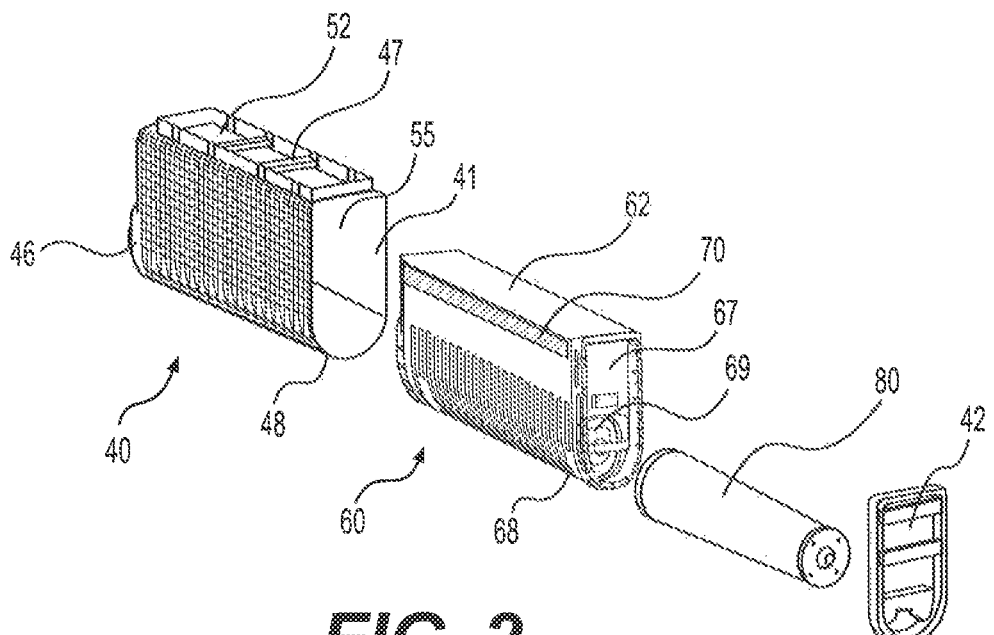
FIG. 2 is a perspective view of the air cleaner of FIG. 1, illustrating various components of the air cleaner.

FIGS. 1 and 2 illustrate an air cleaner 10, according to one exemplary embodiment of the present disclosure. Air cleaner 10 may include a precleaner 20, a plenum 30, a filter housing 40, a primary filter element 60, and a secondary filter element 80. While the various exemplary embodiments of the present disclosure will be described in connection with a particular air cleaner with a precleaner and a duel filter system, it should be understood that the present disclosure may be applied to, or used in connection with, any other type of air cleaners including, but not limited to, an air cleaner that does not include a precleaner and/or a duel filter system.

Precleaner 20 may remove larger particles of dust and debris from the intake air stream before the air reaches primary filter element 60. Precleaner 20 may use a rotating impeller (not shown) inside a cap 22 to force larger particles of dust and debris towards the outer edge of cap 22. The larger particles may then be discharged to outside of cap 22 via a diverter built into the outer edge of cap 22 and a discharge port (not shown). It should be understood that any other type of precleaners known in the art may be used alternatively or additionally. For example, in an alternative embodiment, precleaner 20 may include a separator tube with a plurality of cyclonic vanes that can separate large particles from the inlet airstream via centrifugal motions, where the separated particles can be discharged through a gravity-or vacuum-driven scavenge port.

Air cleaner 10 may also include a plenum 30 that connects precleaner 20 to filter housing 40 to guide the intake air pre-cleaned from precleaner 20 to primary filter element 60 seated inside filter housing 40. Plenum 30 may include a circular inlet opening at one end that connects to precleaner 10 and a rectangular outlet opening at the other end that connects to filter housing 40.

Filter housing 40 may form a generally rectangular body with a rounded bottom surface 48, such that filter housing 40 may have a shape of an inverted mailbox, as best shown in FIG. 2. At the top wall, directly opposite to rounded bottom surface 48, filter housing 40 may include a rectangular inlet opening 52 that connects to the outlet opening of plenum 30. Inlet opening 52 may be securely and sealingly fastened to plenum 30 via welding, a plurality of screws (see FIG. 5), or any other securing method known in the art. Inlet opening 52 may also include one or more structural reinforcements 47 to ensure its structural integrity.

Filter housing 40 may also include a rear opening through which primary filter element 60 can be slidably inserted or removed. Primary element 60 can be slid through rear opening 41 in a direction substantially perpendicular to the direction inlet opening 52 faces. Rear opening 41 can be closed with a cover 42 removably secured to the body of filter housing 40 with a plurality of spring clips 44. On the front side opposite to rear opening 41, filter housing 40 may include a discharge opening 46 through which the filtered air can be discharged from filter housing 40.

Filter housing 40 may be designed to protect primary filter element 60 from potentially damaging working conditions, such as, for example, vibration, corrosion, heat, chemical contaminants, and inadvertent impact from outside. Filter housing 40 may be generally made of a metallic material, but in some exemplary embodiments, certain portions of filter housing 40 may be made of a non-metallic material, such as, for example, a polymeric material.

Figure 3:
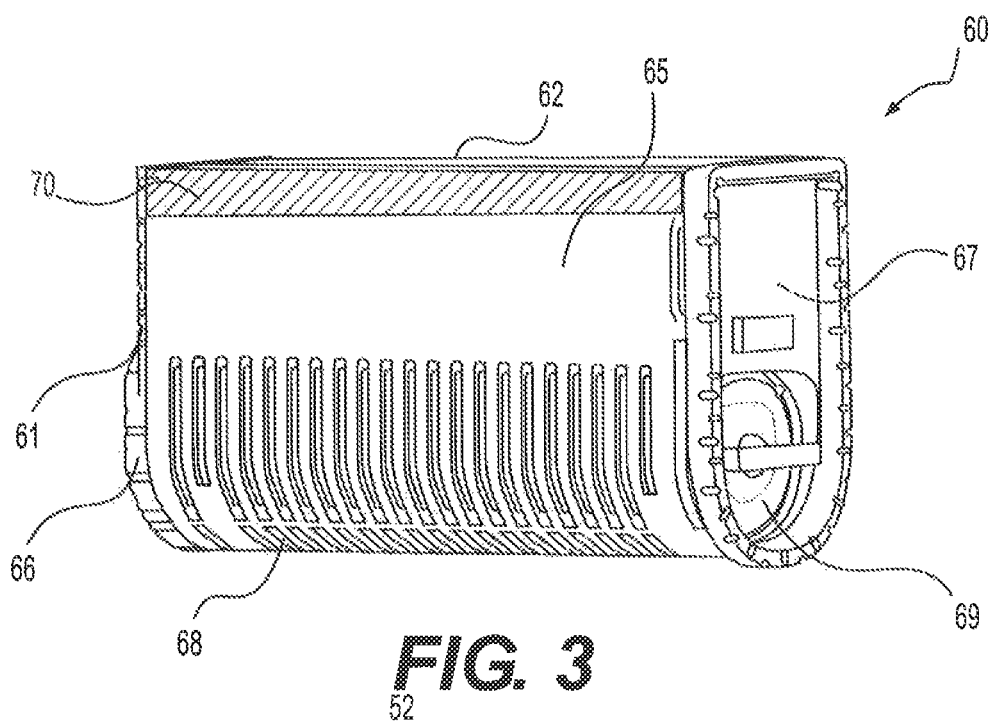
FIG. 3 is a perspective view of a primary filter element, according to one exemplary embodiment.

Primary filter element 60 may be designed to remove the dust, debris, or any contaminants from the intake air before entering the engine. The filter media disposed inside primary filter element 60 may be synthetic, cellulose, or any combination thereof. As shown in FIGS. 2 and 3, primary filter element 60 may have a shape substantially conforming to that of filter housing 40, such that only a small gap 75 (see FIG. 4) may exist between the outer surface of primary filter element 60 and the interior surface of filter housing 40 when primary filter element 60 is received inside the interior 55 of filter housing 40. Gap 75 may also facilitate sliding movement of primary filter element 60 into and out of filter housing 40 without causing any damage to primary filter element 60.

In the disclosed exemplary embodiment, air cleaner 10 may include secondary filter element 80 that can be disposed inside primary filter element 60. For example, as shown in FIG. 2, secondary filter element 80 may have a frustoconical shape, and primary filter element 60 may define an interior space of a frustoconical shape (not shown) for receiving secondary filter element 80 therein. Secondary filter element 80, sometimes referred to as a safety filter, may function as a backup filter when primary filter element 80 fails. Accordingly, some exemplary embodiments may omit secondary filter element 80.

As mentioned above, primary filter element 60 may have a shape substantially conforming to that of filter housing 40. For example, as shown in FIGS. 2 and 3, primary filter element 60 may have a generally rectangular body with a rounded bottom surface 68 (e.g., a shape of an inverted mailbox). Primary filter element 60 may include an inlet opening 62 at its top surface, opposite to bottom surface 68, for receiving the intake air flowing from plenum 30 and inlet opening 52 of filter housing 40. Primary filter element 60 may also include a front surface 61 facing interior 55 of filter housing 40 when primary filter element 60 is slid into filter housing 40. Accordingly, primary filter element 60 may be inserted into filter housing 40 in a direction substantially perpendicular to the direction that inlet opening 62 faces. Front surface 61 may include a discharge opening 66 that mates with discharge opening 46 of filter housing 40 to discharge the filtered air from primary filter element 60. On a rear surface 67, opposite to front surface 61, primary filter element 60 may include a handle 69 for facilitating handling of primary filter element 60, especially when sliding primary filter element 60 into and out of filter housing 40.

On two side surfaces 65 of primary filter element 60 between front surface 61 and rear surface 67, a pair of suitable sealing elements 70 may be disposed to seal gap 75 between side surfaces 65 and filter housing 40. For example, as best shown in FIG. 3, sealing element 70 may comprise a strip of sealing material attached to the uppermost edge of each side surface 65 along substantially the entire length of side surface 65. The material suitable for sealing element 70 may include, but not be limited to, foam, urethane, rubber, silicone, and fiber. In some exemplary embodiments, sealing material 70 may have an adhesive-backed side to readily attach sealing material 70 to side surface 65. Sealing element 70 may be shaped and sized such that sealing element 70 does not hinder the sliding movement of primary filter element 60 relative to filter housing 40. In one exemplary embodiment, sealing element 70 may be coated with a friction-reducing agent.

Figure 4:
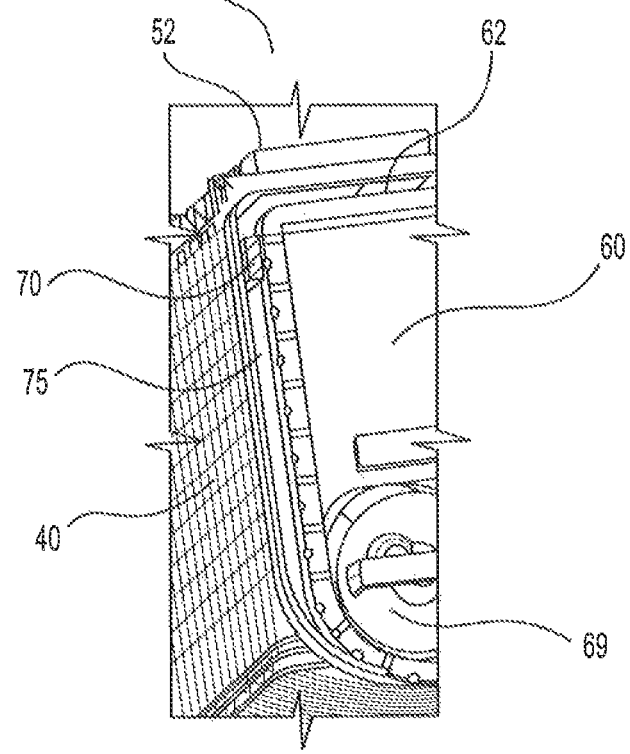
FIG. 4 is a partial perspective view of the primary filter element of FIG. 3 received inside a filter housing, according to one exemplary embodiment.

Referring to FIG. 4, the pair of sealing elements 70 attached to the uppermost edges of side surfaces 65 may contact with the respective inside surfaces of filter housing 40 to substantially seal off gap 75, which disrupts the flow path of intake air flowing from inlet opening 52 of filter housing 40. This may substantially prevent the unfiltered intake air from traveling into gap 75 of filter housing 40. The prevented or substantially reduced air flow into gap 75 may reduce the debris buildup inside filter housing 40, which may eliminate the need for extra cleaning of filter housing 40 during servicing of primary filter element 60 and/or prevent discoloration of secondary filter element 80.

Figure 5:
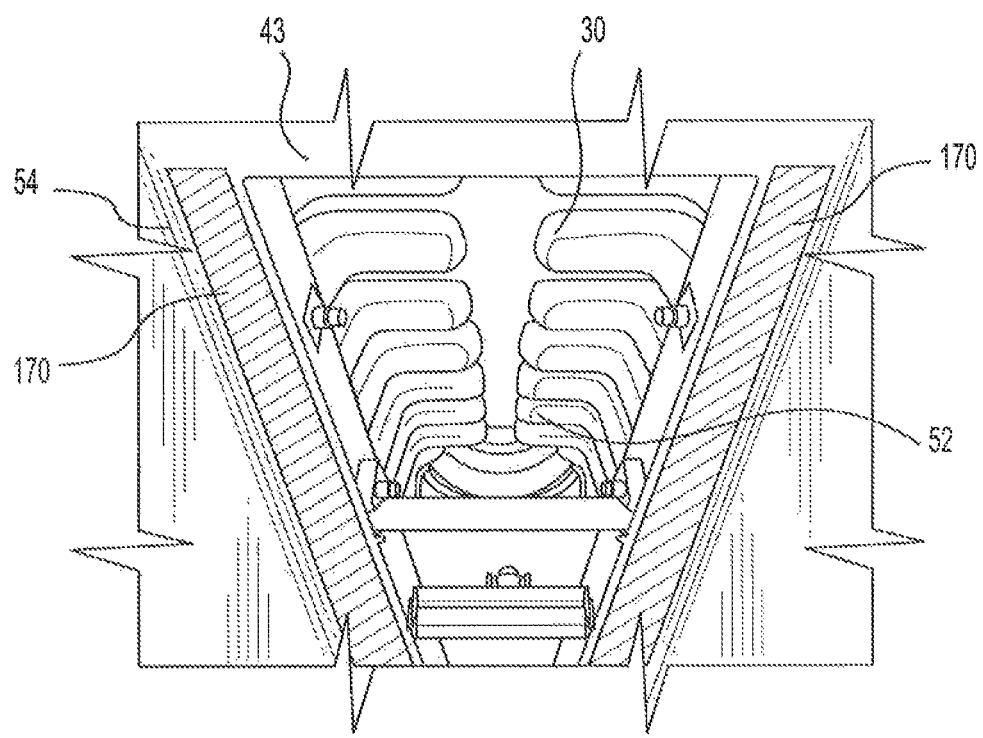
FIG. 5 is a partial interior view of the filter housing, showing an inlet opening of the filter housing, according to one exemplary embodiment.

According to another exemplary aspect of the present disclosure, instead of or in addition to attaching sealing element 70 to primary filter element 60, a suitable sealing element may be attached to an interior surface of filter housing 60 to substantially seal off gap 75. For example, as shown in FIG. 5, a pair of sealing elements 170, in the form of a strip, may be attached to top inner surface 43 of filter housing 40 in a peripheral area 54 around inlet opening 52. Sealing elements 170 thus formed may contact the top side edges of primary filter element 60 to substantially close gap 75. In an alternative embodiment, sealing element 170 may be attached to each side surface of filter housing 40 in the area that contacts the uppermost edge of each side surface 65 of primary filter element 60.

INDUSTRIAL APPLICABILITY

The disclosed air cleaner may be applicable to various air cleaners used in machines, including various off-highway work machines, such as, for example, tractors, wheel loaders, backhoe loaders, bulldozers, and excavators. When applied to a machine, the filter element and filter housing according to the present disclosure may substantially reduce the amount of unfiltered air that enters a space between the filter element and the filter housing. This may reduce the debris buildup inside the filter housing, thereby substantially eliminating the need for extra cleaning of the filter housing during servicing of the filter element and/or preventing the discoloration of the filter element, in particular a secondary filter element. This in turn may reduce the maintenance costs associated with time-consuming cleaning or servicing of the filter element and/or filter housing. With reference to FIGS. 2-5, an exemplary process of applying the filter element and filter housing of the present disclosure to a machine will be described herein.

Prior to inserting primary filter element 60 into interior 55 of filter housing 40, suitable sealing element 70 may be attached to the uppermost edge of each side surface 65 of primary filter element 60, as shown in FIGS. 2 and 3. The material, size, and shape of sealing element 70 may be selected to substantially seal off gap 75 between side surfaces 65 of primary filter element 60 and the interior surface of filter housing 40 without inhibiting the sliding movement of primary filter element 60 relative to filter housing 40. Instead of or in addition to sealing elements 70 attached to filter element 60, in some exemplary embodiments, filter housing 60 may be provided with sealing element 170 attached to the interior surface of filter housing 60 to substantially seal off gap 75, as shown in FIG. 5.

Once sealing elements 70 and/or sealing elements 170 are attached to either or both primary filter element 60 and/or filter housing 40, respectively, primary filter element 60 may be slidably inserted into interior 55 of filter housing 40, according to FIG. 2. When second filter element 80 is used, second filter element 80 may be inserted into filter housing 40 prior to inserting primary filter element 60. Primary filter element 60 may then be inserted into filter housing 40 with secondary filter element 80 mating with the interior space of primary filter element 60. When primary filter element 60 is properly seated inside interior 55 of filter housing 40, sealing elements 70 and/or sealing elements 170 may substantially seal off gap 75 between filter housing 40 and primary filter element 60 to disrupt the flow path of intake air flowing from inlet opening 52 of filter housing 40. This may substantially prevent the unfiltered intake air from traveling into gap 75 between filter housing 40 and primary filter element 60 and directs all of the intake air flowing from inlet opening 52 of filter housing 40 to inlet opening 62 of primary filter element 60. As a result, the debris buildup inside filter housing 40 may be substantially prevented or reduced, which in turn may eliminate the need for extra cleaning of filter housing 40 during servicing of primary filter element 60 and/or prevent discoloration of secondary filter element 80.

It will be apparent to those skilled in the art that various modifications and variations can be made to the disclosed air filtration system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. An air filter element comprising:
 a generally rectangular body with a rounded bottom surface, the generally rectangular body being configured to be inserted into a filter housing in a first direction;
 an inlet opening at a top surface opposite to the bottom surface of the generally rectangular body, the inlet opening facing in a direction substantially perpendicular to the first direction;
 a front surface facing substantially in the first direction and defining a discharge opening;
 a rear surface opposite to the front surface of the generally rectangular body; and
 a pair of sealing elements, each sealing element disposed on a side surface of the generally rectangular body between the front surface and the rear surface, such that the sealing elements substantially seal off a gap between the side surface of the filter housing and the generally rectangular body when the generally rectangular body is inserted into the filter housing, wherein the sealing elements are each attached to the uppermost edge of the side surface proximate the inlet opening.

2. The air filter element of claim 1, wherein the inlet opening is substantially rectangular.

3. The air filter element of claim 1, further comprising a secondary filter element disposed inside the generally rectangular body.

4. The air filter element of claim 1, wherein the generally rectangular body further comprises a handle on the rear surface for facilitating handling of the generally rectangular body.

5. The air filter element of claim 1, wherein the sealing element comprises a strip of sealing material attached along substantially the entire length of the side surface.

6. An air filter housing comprising:
a generally rectangular body with a rounded bottom surface, the generally rectangular body defining an interior for receiving a filter element;
a rear opening in the generally rectangular body for slidably receiving the filter element in a first direction;
a top wall, opposite to the bottom surface of the generally rectangular body, defining an inlet opening for receiving air, the inlet opening facing in a direction substantially perpendicular to the first direction;
a discharge opening on a front surface opposite to the rear opening; and
a sealing element disposed on an interior surface of the top wall in at least a portion of a peripheral area around the inlet opening, such that the sealing element substantially seals off a gap between the interior surface and the filter element when the filter element is received in the interior.

7. The air filter housing of claim 6, wherein the sealing element comprises a pair of sealing elements attached to respective opposing sides of the peripheral area.

8. The air filter housing of claim 6, wherein the sealing element comprises a strip of sealing material attached along substantially the entire length of the inlet opening.

9. The air filter housing of claim 6, wherein the sealing element is attached to an interior surface of the generally rectangular body that corresponds to an uppermost edge of a side surface of the filter element when the filter element is received in the interior.

10. The air filter housing of claim 6, further comprising a removable cover for closing the rear opening.

11. The air filter housing of claim 6, wherein the inlet opening is substantially rectangular.

* * * * *